May 16, 1950 M. A. ELLIOTT ET AL 2,507,508
WATER SEALING CABLE CONSTRUCTION
Filed Nov. 11, 1944
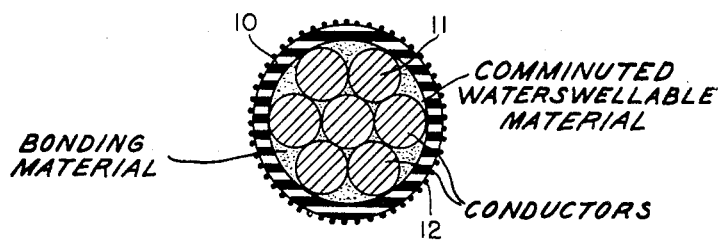
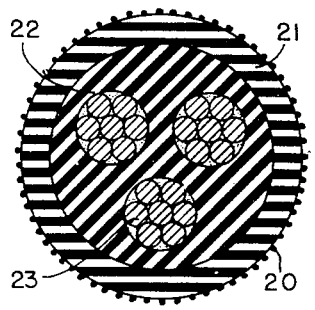
Inventors
MYRON A. ELLIOTT
HERBERT A. POHL
By P. E. Bush
Attorney Patented May 16, 1950

2,507,508

UNITED STATES PATENT OFFICE 2,507,508

WATER SEALING CABLE CONSTRUCTION

Myron A. Elliott and Herbert A. Pohl, Washington, D. C.

Application November 11, 1944, Serial No. 563,043

5 Claims. (Cl. 174—114)

(Granted under the act of March 3, 1883, as amended April 30, 1928; 370 O. G. 757)

Our invention relates to the construction of a multi-stranded cable having high water impedance and a method of fabricating such a cable.

Recent uses of heavy cables on board ship and in other places where the cable is or might be exposed to water have pointed up a serious weakness in mutli-stranded cable as it is now constructed. Common constructions employ seven, nineteen, or more strands per conductor but any number can be used. The completed cable may be either single or multiconductor. Although the mechanical construction is rugged and looks compact, the free volume, for example, in a conductor made up of seven strands is over twenty per cent of the total circumscribed volume. A cable comprising three seven-strand conductors thus has the equivalent of a relatively large diameter open tube running its entire length and having a cross-section about sixty per cent of the cross section of one of the conductors. Ordinarily the large free volume in a cable has no effect on its characteristics.

In warships great effort is made to insure the watertight integrity of compartments and to have cable with a large free volume passing from one compartment to another involves the risk of flooding a dry compartment in case a cable connects it to a flooded one. Another serious risk likely to occur in almost any common power installation is that of damaging electrical machinery at the dry end of a cable should one end be exposed to a head of water.

It is the primary object of our invention to provide a multi-stranded cable which will not permit the flow of water therethrough.

It is a secondary object of our invention to provide a cable capable of sealing itself automatically against the flow of water in case of exposure thereto.

It is another object of our invention to provide such automatically self-sealing cable without affecting its electrical load carrying ability.

Other objects and advantages of our invention will in part be obvious and in part appear hereinafter.

Our invention comprises the cable possessing the features, properties, and the relation of elements, which are exemplified in the following detailed disclosure and the scope of the invention will be indicated in the claims.

The construction of our cable and the method of fabricating it can be more readily understood by reference to the following detailed description thereof and the accompanying drawings in which:

Figure 1 is a drawing representing a cross-sectional view of a seven-strand single-conductor cable;

Figure 2 is a drawing representing a cross-sectional view of a seven-strand three-conductor cable.

In the figures we represented the cables as seven strand for simplicity and clarity. Actually, large cables contain many more than seven strands in a single conductor.

Referring to Figure 1, 10 represents the outer insulating jacket, 11 represents a wire, seven of which comprise the conductor, and 12 the outer armor. It can be easily shown that the interstitial area in the cross section of a cable like that shown in the drawing is $2/9$ of the total cross sectional area circumscribing a single seven strand conductor, as follows:

Let $A_1$ represent the area circumscribed by the inner diameter of 10, $A_2$ represent the area of a wire 11, $R$ and $r$, respectively, represent the radius of the circumscribed area and the radius of a wire. It follows that, $A_1 = \pi R^2$, $A_2 = \pi r^2$, $R = 3r$, and $A_1 = 9\pi r^2$. Since the total cross sectional area of the wires is $7\pi r^2$ (seven wires) the insterstitial area, $A_1 - A_2 = 9\pi r^2 - 7\pi r^2$ and $$\frac{A_1 - A_2}{A_1} = \frac{2}{9}$$

In Figure 2 there is illustrated a three conductor cable in which 20 represents the armored casing, 21 and 22 insulating material enclosing the conductors and 23 the wires making up the conductors of which, in this case, there are twenty one. In this particular instance, the total interstitial area is $6/9$ or practically 70% of the cross-sectional area of a single conductor.

It is apparent from the above consideration of the geometry of stranded cables that every cable, in addition to conductors, has the equivalent of a substantial open tube running its length. By means of some simple tests we have found that by applying water under a head of thirty feet to one end of a five-foot length of medium size navy cable containing a single conductor of seventy-three strands of Number 18 wire (total diameter was $\frac{7}{16}$ inch) water flowed through it at the rate of sixteen gallons per hour.

The geometry of cables comprising insulated and armored bundles of wire, for example, the telephone type of cable, is exactly analogous to that of the stranded cable outlined above. The interstitial free volume in a cable comprising a bundle of separately covered wires or conductors is a substantial fraction of the total volume of the cable.

In the past a great many different cable constructions have been devised in which powdered mineral materials such as glass, mica, sand, calcium oxide, magnesium oxide and asbestos have been used as the primary insulating material.

By primary insulating material we mean that material which separates, insulates and holds in spatial relationship the several conductors of a cable. For example, it is well known in the cable art to construct coaxial cable in which the dielectric is calcium oxide, magnesium oxide or a mixture of the two. Our invention is not concerned with the provision of primary insulating materials for cables. Our invention is concerned with cable constructions resistant to the flow of water therethrough and methods of rendering cable resistant to the flow of water therethrough by means of a modification of their constructions and method of their assembly.

We have discovered that by including a water swellable material in the interstitial volume of a cable its water impedance is so increased that water under head of 30 feet cannot penetrate more than a few inches beyond the end exposed thereto in a period of many hours.

A large variety of water swellable sealing materials can be used, among which are inorganic materials such as various prepared bentonite clays; polymers such as polyvinyl alcohol, methyl cellulose, cellulose acetate and some celluloses; proteins such as gelatin, casein glue, egg albumen, fibrin; saccharocolloids such as agar, Irish moss, pectin, "soluble" starches, dried kelp, mucilage; natural gums such as gum tragacanth; powdered soap such as sodium stearate, commercial soap powders, etc. These types of materials have certain properties in common, namely, they are capable of existing in a dry powdered form, most of them are soluble to an appreciable extent in fresh or salt water and, finally, they swell quickly and agglomerate upon exposure to water when they go into solution. It is this last property, that of being capable of swelling rapidly and agglomerating to some extent, that is essential to their being able to form rapidly a firm barrier to the flow of water through the powder. In using materials of any of the above types, it is preferable to have them in powdered or dry form and to place the powder in the interstitial volume of the cable in dry unswollen form during manufacture and to have it dry and unswollen during normal use. When water enters the cable at any point, it will contact the dry powder, and the powder will swell and choke off passages otherwise open for leakage.

The method of putting our invention into practice will be clearly understood from the following examples:

Example I

A seven strand conductor was made up by coating of Number 16 copper wire individual strands with a thin sticky film of polyisobutylene having a molecular weight of 10,000. The coated strands were first dusted with powdered bentonite, then grouped to form a conductor and finally bound together with a rubber insulating jacket.

The conductor thus made was tested for its water impedance by applying water under a head of thirty feet to one end of a ten inch piece of the cable so constructed. No water appeared at the other end even after forty-eight hours. Subsequent dissection of the cable revealed that water had penetrated the cable a distance of only two inches.

A series of tests to determine the rate of water penetration revealed that substantially all of the penetration occurs in the first few seconds of exposure of the cable to the water.

Example II

A conductor similar to that of Example I was made up in which a heat reactive insulating varnish was used as the binder to hold the bentonite in place. The varnish used was a standard high-quality electrical deep drying product. Any deep drying type of varnish used for electrical insulating purposes can be used; for example, S-110, a phenol-formaldehyde resin base electrical insulating varnish, manufactured by Sterling Varnish Co. is quite satisfactory.

The wires were coated, and while the varnish was still tacky they were dusted with bentonite and then gathered into a rubber jacket to form a cable.

A ten inch piece of the cables thus made up withstood a forty eight hour test under a thirty foot head of water with a water penetration of only 3 inches.

Example III

Seven strands of Number 16 wire to make up a conductor were coated with a bentonite-glycerine paste having the following composition: bentonite 49 parts, glycerine 50 parts and borax 1 part. The borax was used to prevent the corrosion of the copper. The paste was extruded onto the wires in sufficient quantity to fill completely the interstitial volume of the group of wires forming the conductor.

Under test, a ten-inch piece of the glycerine-bound bentonite-filled conductor withstood a thirty foot head of water for forty-eight hours with no leakage.

Example IV

Ten three-foot lengths of radio-type wire were coated, that is, the outer silk covering was coated with a very thin film of electrical insulating varnish and generously dusted with powdered bentonite. The wires were then securely wrapped with rubber electricians' tape to simulate closely a telephone type cable.

Under test, the cable thus made withstood a thirty-foot head of water for forty-eight hours with no leakage. Dissection of the cable revealed that water had penetrated only four inches along its length.

Similar tests were made using a variety of other materials and several different binding materials the results of which are summarized in the following table. In each instance, the amount of powdered swellable material in dry form was sufficient to reduce the free volume in the cable by at least about 25%.

Table

| Water Swellable Material | Binder | Head Water in Test, Feet | Depth Water Penetration in 48 Hours, Inches |
|---|---|---|---|
| Palmolive soap powder | None | 30 | 5 |
| Powdered sodium stearate | do | 30 | 3 |
| Bentonite | do | 30 | 2 |
| Gelatin | do | 30 | 4 |
| Egg albumen | do | 30 | 4 |
| Gelatin | Varnish | 30 | 2 |
| Polyvinyl alcohol | do | 30 | 4 |
| Methyl cellulose | do | 30 | 10 |
| Casein glue | do | 30 | 10 |
| Egg albumen | Rubber Cement | 30 | 15 |
| Agar | do | 30 | 12 |
| Pectin | Tung oil | 30 | 15 |
| Polyvinyl Alcohol | None | 30 | 3 |
| Methyl cellulose | do | 30 | 6 |
| Casein glue | do | 30 | 5 |

Although the data given in the above table are quantitative in appearance it should be pointed out that one variable, namely, the amount of water swellable material used, has been omitted. In all our tests we used enough of the water swellable material substantially to fill the interstitial volume of the cable. Since some of the materials are more dense than others and, further, since some swell more than others when exposed to water, the variation in the depth of water penetration can be explained on this basis. The essential point established by our test data is that the water swellable materials will seal off the cable, certain ones much more efficiently than others, and, consequently, some should be packed more densely into the cable interstices than others.

Current carrying tests on cables constructed according to our invention indicated that no noticeable effect was produced by the inclusion of the sealing agents in the assembly. The overload current carrying ability and heating characteristics were substantially unchanged.

From the foregoing description, examples and data, the embodiments of our invention will be clear, but it is to be understood that the invention is not restricted to the present disclosure to any extent otherwise than it is restricted by the manner in which such invention is claimed. It is also intended that the following claims are intended to cover all of the generic and specific features of the invention herein described, and all the statements of the scope of the invention, which, as a matter of language might be said to fall therebetween.

The invention described herein may be manufactured and used by or for the Government of the United States of America for governmental purposes without the payment of any royalties thereon or therefor.

We claim:

1. An electrical cable resistant to axial water flow comprising a multiplicity of cylindrical conductor elements assembled together in parallel relationship to define longitudinal interstices, an insulating jacket sheathing the elements, and a bonding varnish coating on the elements carrying comminuted water-swellable material lining the longitudinal voids.

2. An electrical cable resistant to axial water flow comprising a multiplicity of cylindrical conductor members assembled together in parallel relationship to define longitudinal interstices, an insulating jacket sheathing the members, and adherent comminuted water-swellable material bonded to the members and lining the interstices.

3. An electrical cable comprising cylindrical conductor elements positioned to establish longitudinal interstices in the cable, a varnish coating on the elements, and comminuted bentonite carried by the varnish and lining the interstices.

4. An electrical cable comprising cylindrical conductor elements positioned to establish longitudinal interstices in the cable and a coating of comminuted gelatin carried by the elements and lining the voids.

5. An electrical cable comprising cylindrical conductor elements positioned to establish longitudinal interstices in the cable and a coating of comminuted polyvinyl alcohol carried by the elements and lining the voids.

MYRON A. ELLIOTT.
HERBERT A. POHL.

REFERENCES CITED

The following references are of record in the file of this patent:

UNITED STATES PATENTS

| Number | Name | Date |
|---|---|---|
| 1,635,829 | Frederickson | July 12, 1927 |
| 1,787,749 | Heyroth | July 6, 1931 |
| 2,185,558 | Lunsford | Jan. 2, 1940 |

FOREIGN PATENTS

| Number | Country | Date |
|---|---|---|
| 237,885 | England | of 1927 |
| 261,018 | England | of 1927 |
| 520,999 | England | May 9, 1940 |

OTHER REFERENCES

"Volclay" "Water Impedance with Volclay Bentonite"; revised Oct. 1936; pub. by American Colloid Co., Chicago, 1936.